March 11, 1958     D. A. HAYES     2,826,032
MOWER CARRIED SHARPENER FOR HORIZONTALLY ROTATING BLADES
Filed June 11, 1954     2 Sheets-Sheet 1

INVENTOR
David A. Hayes
BY Lancaster, Allwine Rommel
ATTORNEYS

March 11, 1958 D. A. HAYES 2,826,032
MOWER CARRIED SHARPENER FOR HORIZONTALLY ROTATING BLADES
Filed June 11, 1954 2 Sheets-Sheet 2
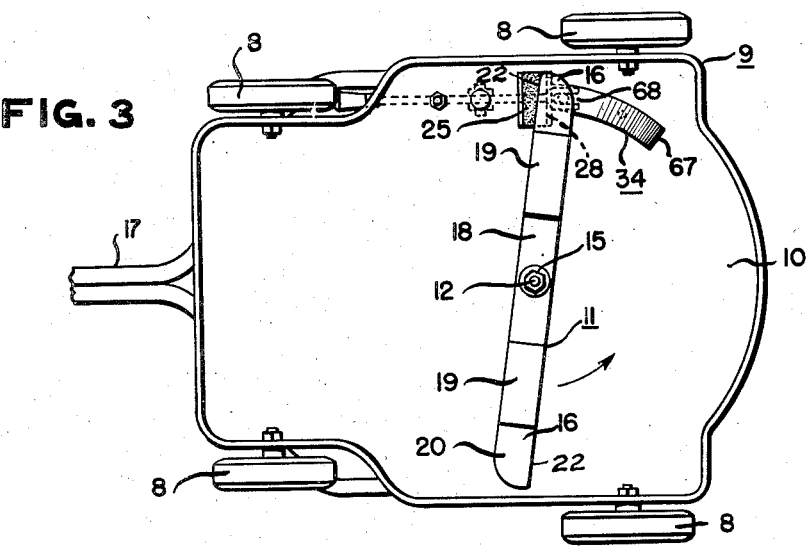
FIG. 3
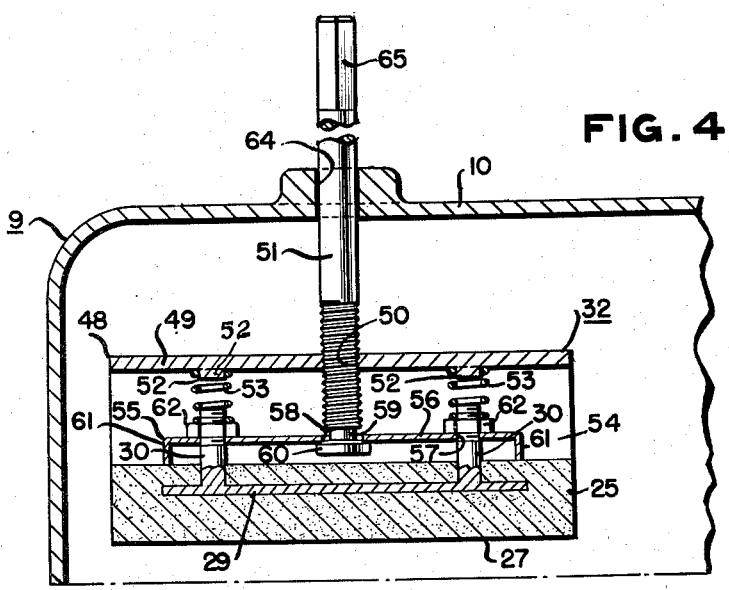
FIG. 4
FIG. 6
INVENTOR
David A. Hayes
BY
Lancaster, Allwine & Rommel
ATTORNEYS

United States Patent Office 2,826,032
Patented Mar. 11, 1958

2,826,032

MOWER CARRIED SHARPENER FOR HORIZONTALLY ROTATING BLADES

David A. Hayes, New Smyrna Beach, Fla.

Application June 11, 1954, Serial No. 435,994

15 Claims. (Cl. 56—255)

This invention relates to sharpeners for the blades of lawn or grass mowers of the types having horizontally rotating blades, generally referred to as rotary lawn mowers.

Mowers of this type have proven very satisfactory in operation, if the knife blades are sharp, due to the fact that they are comparatively light in weight, in contradistinction to mowers of the reel type and those having reciprocating cutter bars; and may be successfully used in cutting rather tall grass and weeds. However, in connection with contemporary mowers of this type, it is quite a task, and time consuming to remove, sharpen and replace the knife blades, after the mower has been used for quite some time. As a consequence users are prone to cut lawns with mowers having dull knife blades and the results are far from satisfactory.

In order to adjust such types of mowers to retain the desired stand of grass as the mower passes over the lawn, such as anywhere from 1½ inches to 3 inches in hot weather, there are generally two arrangements provided, one of which is to render the ground wheels adjustable vertically with respect to the frame or main body portion of the mower, under which condition the orbit of rotation of the knife blades remains the same with respect to the mower frame or body throughout the range of adjustment. The patent to Lundin 1,992,494 and to Hainke 2,564,201 are examples of such type of mower. The other or second arrangement for such adjustment is to provide means whereby the knife blades may be adjusted vertically with respect to the mower frame or body, the ground wheels being non-adjustable. The patent to Puls 2,565,044 of August 21, 1951 is an example of such an arrangement. Furthermore, with both types of rotary mowers it is the practice to provide substitute knives for those with which the mowers were originally equipped, and these substitute knives may not always dispose the cutting edges of the blades in the same plane as that in which the cutting edges of the original blades rotated.

The principal objects of the present invention are to provide sharpeners which are incorporated in and/or carried by the mowers, and which may be brought into use for blade sharpening purposes without removing the blades from the mowers thereby enabling the users, by way of example, to sharpen the blades during mowing operations, whenever it is noticed that the results of use are not satisfactory, due to dull blades; and to render the sharpeners adjustable both as to attaining optimum contact between the blades and the abrasive element for satisfactory grinding, where either type of arrangement for adjustment of stand of grass is provided, and to adapt the sharpeners to the second mentioned type of arrangement, where the knife blades are bodily adjustable in a vertical direction with respect to the ground wheels of the mower.

Other objects and advantages will appear in the following detailed description of one embodiment of the present invention, taken in connection with the accompanying drawings, forming a part of this specification, and in which drawings:

Fig. 3 is a bottom plan view of the mower shown in Fig. 1, omitting the handles and a portion of the handle bar.

Fig. 4 is an enlarged sectional view on the line 4—4 of Fig. 1.

Fig. 6 is an enlarged perspective view of a suitable abrasive element with portions of attaching means carried thereby.

Figure 1:
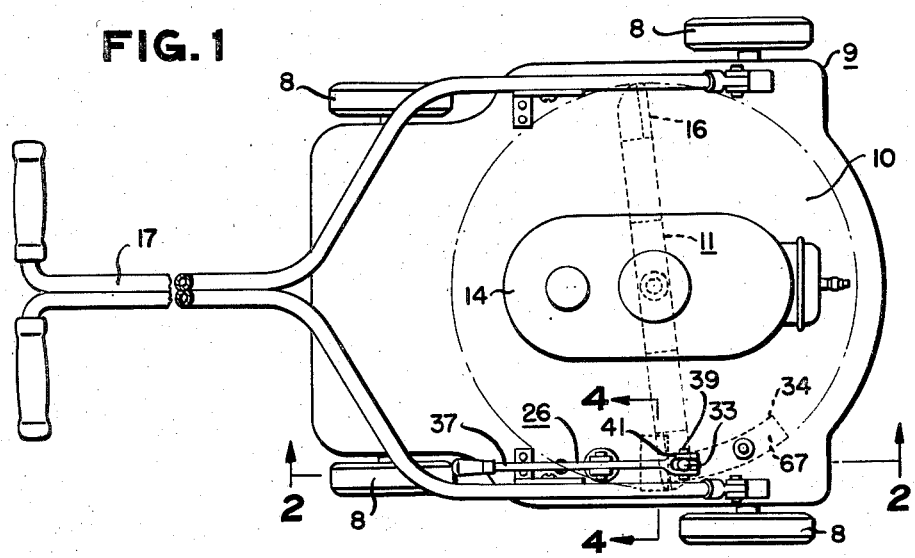
Fig. 1 is a top plan view of a power rotary mower showing my invention applied thereto.

In the drawings I have shown the invention applied, by way of example, to a power rotary mower of the type where the desired stand of grass after mowing is had by adjusting ground wheels 8 with respect to a frame 9, including a platform 10, and where a cutting knife 11 is horizontally rotatable beneath the platform by a vertical drive shaft 12 operated by a prime mover 14, such as an internal combustion engine. In the example shown, the knife 11 is detachably secured to the lower end portion of shaft 12, by a nut 15, and includes two radially disposed blades 16. Any suitable handle 17 is connected with the frame 9, and may carry any suitable controls, not shown in the drawings, for the prime mover 14.

The knife 11, in the example shown, is provided with an arched central portion 18 from which extend diametrically opposite arms 19, each having a blade 16, preferably tilted so that its lower face 20 is inclined downwardly and rearwardly with respect to the direction of rotation, indicated by arrow in Fig. 3, from its substantially radial cutting edge 22 which is preferably provided by beveling the upper portion of the blade as indicated at 23. Thus the cutting edges 22 of the blades 16, when in use, normally rotate in a substantially horizontal plane. Various types of knives may be applied to the shaft 12, some of which may have the cutting edges of the blades rotatable in a plane higher or lower than that shown in the example illustrated or with some types of mowers the plane of rotation of the cutting edges may be raised or lowered by bodily adjusting the drive shaft 12 vertically, as in the aforesaid Patent 2,565,044.

Figure 2:
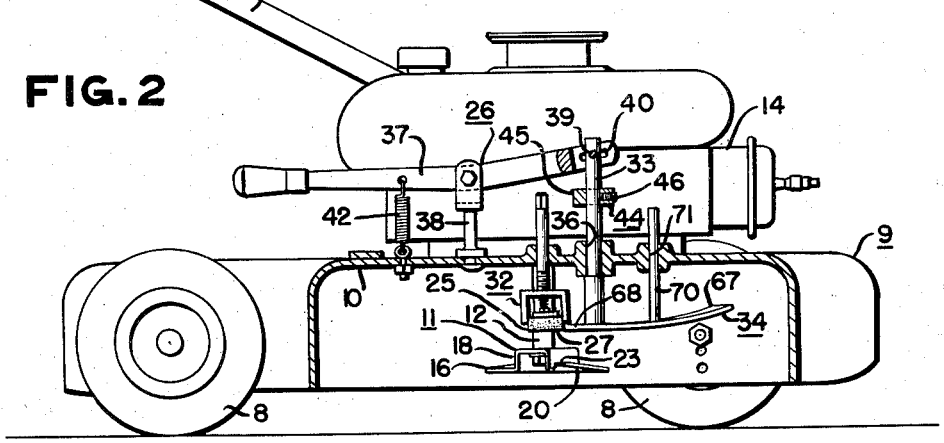
Fig. 2 is an enlarged vertical sectional view on substantially the line 2—2 of Fig. 1.
Figure 5:
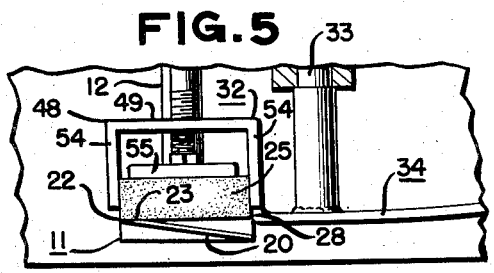
Fig. 5 is an enlarged detail view partly in elevation and partly in vertical section of a portion of the sharpener and showing a mower blade engaging the abrasive element thereof.

The sharpener for the blades 16, comprises an abrasive element 25 and means 26 carried by the mower frame, in readiness to be brought into use whenever desired by the operator, for supporting and moving the abrasive element into active position for sharpening engagement with the substantially radial cutting edges of the blades, such engagement being shown in Fig. 5, the abrasive element being normally out of the orbit of rotation of the cutting edges as shown in Fig. 2.

The abrasive element 25 is preferably an elongated rectangular stone having a flat lower face 27 carried in such manner as to intersect at a slight angle, the plane in which the cutting edges of the blades rotate, and with a longitudinally extending edge 28 nearest in the direction of rotation of the blades, disposed in non-parallel relation to the cutting edge of the blade as it contacts the abrasive element, whereby sharpening takes place in scissor-like fashion, as indicated in Figs. 1 and 3. The abrasive element 25 preferably has molded in it a carrying strip 29 for spaced screw threaded stems 30 projecting beyond the upper face of the abrasive element as shown in Fig. 6, for a purpose to be subsequently set forth.

The means 26 preferably comprises a carrier 32 for the abrasive element 25; a rod 33 connected with the carrier 32, as by a guide 34, to be subsequently described, the rod extending through a guide opening 36 in the platform 10; a hand lever 37 above the platform and supported intermediate its ends by a standard 38 secured thereto, one end portion of the lever being operatively connected to the upper end portion of the rod as by a transverse pin 39 carried by the rod, the ends of the pin operating in longitudinally extending slots 40 in a forked end portion 41 of the lever; and a contraction coil spring 42 connected to the lever 37 and to the platform 10, this spring being located to the side of standard 38 opposite from location of rod 33, so as to yieldably bias the abrasive element 25 to a non-sharpening position, as shown in Fig. 2.

It is also preferred to provide an adjustable stop device 44 to limit the extent to which the abrasive element 25 may be moved downwardly by means 26. This stop device may comprise a collar 45 on rod 33 above platform 10 and a set screw 46 carried by the collar for securing it in the desired position on the rod, so that as the rod is moved downwardly, the collar 45 will engage the platform, when the abrasive element 25 is in proper position with respect to the plane of rotation of the cutting edges of the blades. This stop device is particularly useful with those types of mowers where the drive shaft and knife are bodily adjustable vertically with respect to the mower frame to attain the desired stand of grass when mowing, but will also be found useful with the types of mowers where such adjustment is accomplished by changing the position of the axles of the ground wheels with respect to the mower frame, in the event a different type of blade is substituted for that previously used but which does not have the cutting edges rotating in the same plane as that in which the cutting edges of the discarded knife rotated.

The carrier 32, in the example shown, preferably includes an inverted channel frame 48 the web 49 of which has a screw threaded opening 50 for an adjusting screw 51, and depending lugs 52 for the upper end portions of expansion coil springs 53. The flanges 54 of the frame are parallel for embracing relationship with the abrasive element 25, but preferably inclined in a direction to slightly cant the lower face 27 of the latter for the purpose previously set forth.

The carrier also preferably includes a coupling member 55 which may be of inverted channel shape, the web 56 of which is provided with openings 57 for the stems 30 through which they freely pass, and an opening 58 for freely receiving a neck 59 at the lower end of adjusting screw 51, which neck has integral with its lower end a head 60 larger than the opening 58 as shown in Fig. 4. The coupling member 55 has its flanges 61 bearing upon the element 25, and is held in place by nuts 62 on the stems 30, turned tight against the web 56 of the member 55. The springs 53 have their lower end portions centered about the stems 30 and exert downward pressure upon the member 55 and hence to the abrasive element 25, limited by engagement of the head 60 against the underside of the web 56. These springs 53 may, however, yield so as to permit slight upward movement of the abrasive element 25 as is obvious from an inspection of Fig. 4, as the blades traverse the lower face of the abrasive element. The adjusting screw 51 may extend freely through an enlarged opening 64 in the platform 10 and at its upper end may be provided with a wrench receiving formation 65 to facilitate rotation of the screw. By rotating the screw 51 in one direction, the abrasive element 25 may be adjusted downwardly so as to position its lower face in proper position for sharpening engagement with the substantially radial cutting edges of the blades preferably with "slicing" action from the inner portion outwardly or as previously stated in scissor-like fashion. The adjusting screw 51 is also used to lower the abrasive element 25 as it becomes worn due to use.

The guide 34 is preferably arcuate in shape, in plan, as shown in Figs. 1 and 3 radiused from the axis of shaft 12, and arcuate or inclined in elevation and positioned so that it is in the path of movement of the blades 16 in advance of the abrasive element 25, the guide having a leading end portion 67 spaced from the normal plane in which the cutting edges 22 move and trailing end portion 68 disposed substantially in the plane in which the cutting edges of the blades rotate. The end portion of the guide 34 may be formed integral with or welded to one of the flanges 54 of frame 48.

The lower end portion of rod 33 may be welded or otherwise secured to extend from the upper portion of guide 34. It is also preferred to provide a second rod 70 parallel with rod 33, secured, as by welding, to the upper portion of guide 34 intermediate its ends, this rod 70 extending through an opening 71 in platform 10.

The operation of the sharpeners is clear from the foregoing description, however, certain additional advantages are pointed out. The sharpener is preferably brought into use when the knife is not rotating at high speed, but rather the abrasive element may be brought to an active position before the prime mover 14 is started, or if running, then preferably after the prime mover, if an internal combustion engine has been throttled to low speed, or if an electric motor, after it has been shut off, the sharpener being brought into active use while the knife is spinning due to attained momentum. In the event that one of the blades or its arm has been bent upwardly, as at times occurs when the mower has passed over some obstructing solid object on the lawn, the operator will be apprised of such fact by a pronounced sound resulting from contact of the bent portion of the knife contacting the guide 34, and may set about it to remedy the defect.

While the invention as herein disclosed contemplates the provision of a knife, each blade of which has the bevel, providing the cutting edge, uppermost so that the sharpening means may be slightly raised to an inoperative position or even out of the zone of any whirling grass or weed ends cut by the knife, and this construction and formation of the blade has an advantage in that the blade is less likely to be permanently set in an upwardly bent position upon encountering rounded stones, at times found on lawns, the principle of the invention is applicable to mowers of the rotary type where the bevel is lowermost.

In the example shown, the frame 9 is especially made to receive parts of the sharpening mechanism, but it is contemplated that such may be applied to contemporary mower frames, in some instances by drilling holes in the platform of the frame and in other instances by providing a supplemental platform, not shown on the drawing, extending over an opening cut in the conventional mower frame platform.

I claim:

1. In combination with a lawn mower of the type in which a blade is mounted on a frame for rotation in a predetermined direction, with a substantially radial cutting edge movable in a substantially horizontal plane; a sharpener for the blade comprising an abrasive element, and means carried by the mower frame for moving said abrasive element into a first position in sharpening engagement with the cutting edge of the blade as it rotates, and to a second position out of said sharpening relationship with said blade during normal cutting operation of the mower.

2. The combination of claim 1 in which said abrasive element has a flat face disposed to intersect said plane at an angle when in said first position.

3. The combination of claim 2 in which said abrasive element is elongated with a longitudinally extending edge nearest in the direction of rotation of the blade disposed in non-parallel relation to the cutting edge of the blade as it contacts the abrasive element whereby the sharpening takes place in scissor-fashion.

4. The combination of claim 2 in which said abrasive element is yieldably supported by said means so as to be forced out of intersecting relationship with said plane as the cutting edge traverses the abrasive element.

5. The combination of claim 2 in which means is provided to regulate the extent to which said flat face extends above and below said plane when in said first position.

6. The combination of claim 1 in which said means is spring biased to yieldably dispose said abrasive element in said second position.

7. The combination of claim 1 in which a guide is provided in the path of movement of said blade in advance of said abrasive element, said guide having a leading end portion spaced from said plane and a trailing end portion disposed in said plane whereby the blade, if sprung from normal, upon engaging said leading end portion of the guide will be moved to said plane and for sharpening engagement with the abrasive element by said trailing end portion of the guide.

8. The combination as specified in claim 7 in which said means carries said abrasive element and said guide.

9. In a lawn mower comprising, the combination of a frame, including a platform; a horizontally rotatable knife, disposed below said platform, and provided with a blade, beveled at its upper portion, providing a substantially radial cutting edge and having its lower face inclined downwardly and rearwardly from the cutting edge with respect to the direction of rotation of the blade; an abrasive element; a carrier for said abrasive element disposing an abrasive face thereof confronting the orbit of rotation of said blade; and means supporting said carrier, by said platform, constructed and arranged to move said carrier and abrasive element vertically so that the latter may be moved to a first position in sharpening engagement with beveled portion of the blade, and to a second position retracted from the orbit of rotation of the blade.

10. The combination of claim 9 in which said means includes a vertically movable rod connected with said carrier and extending through said platform, and a stop device is adjustably carried by said rod above the platform for cooperation therewith, to limit the extent to which said abrasive element may be moved downwardly.

11. The combination of claim 9 in which means is provided for vertical adjustment of said abrasive element in its carrier.

12. The combination of claim 9 in which yieldable means is interposed between said abrasive element and its carrier to permit limited vertical movement of the abrasive element during sharpening engagement of the blade with the abrasive element.

13. The combination of claim 9 in which said means includes a vertically movable rod extending through said platform, and a guide connected with the lower end of said rod, and with said carrier, said guide having a leading end portion spaced from the orbit of rotation of the blade and a trailing end portion disposed in the plane of said face of said abrasive element, whereby the blade if sprung upwardly from normal, upon engaging said leading end portion of the guide will be moved by the guide for sharpening engagement with said abrasive element when the latter is in said first position.

14. The combination of claim 9 in which said means includes a vertically movable rod connected with said carrier and extending through said platform, and a hand lever mounted upon said platform, operatively connected with the upper portion of said rod for moving the rod vertically.

15. The combination of claim 14 in which said means also includes a spring normally biasing said abrasive element to said second position.

References Cited in the file of this patent
UNITED STATES PATENTS

| | | |
|---|---|---|
| 1,044,137 | Cassady | Nov. 12, 1912 |
| 1,336,257 | Muzzy | Apr. 6, 1920 |
| 1,826,517 | Klockner et al. | Oct. 6, 1931 |
| 1,962,847 | Streckfuss | June 12, 1934 |
| 2,198,526 | Cockburn | Apr. 23, 1940 |
| 2,362,400 | Randle | Nov. 7, 1944 |
| 2,578,880 | Doyle | Dec. 18, 1951 |